United States Patent [19]
Dahlén et al.

[11] Patent Number: 6,131,705
[45] Date of Patent: Oct. 17, 2000

[54] PLAY ADJUSTMENT

[75] Inventors: Tord Dahlén; Jonny Strandberg, both of Eskilstuna, Sweden

[73] Assignee: Volvo Wheel Loaders AB, Eskilstuna, Sweden

[21] Appl. No.: 09/284,288

[22] PCT Filed: Oct. 9, 1997

[86] PCT No.: PCT/SE97/01688

§ 371 Date: May 11, 1999

§ 102(e) Date: May 11, 1999

[87] PCT Pub. No.: WO90/04115

PCT Pub. Date: Apr. 19, 1990

[30] Foreign Application Priority Data

Oct. 10, 1996 [SE] Sweden ................................. 9603705

[51] Int. Cl.[7] .............................. F16D 55/40; F16D 65/54
[52] U.S. Cl. ...................................... 188/71.8; 188/196 R
[58] Field of Search ............................... 188/71.8, 196 R, 188/71.5, 72.3, 216, 196 A, 196 C, 196 M, 71.9, 198–203, 366, 367, 196 P, 351, 196 V, 71.7; 192/111 R, 111 A

[56] References Cited

U.S. PATENT DOCUMENTS

| | | |
|---|---|---|
| 3,958,670 | 5/1976 | Anderson ............................. 188/196 R |
| 3,990,547 | 11/1976 | Plaat ....................................... 188/71.8 |
| 3,995,721 | 12/1976 | Chambers . | 
| 4,010,828 | 3/1977 | Ditlinger . |

FOREIGN PATENT DOCUMENTS

| | | |
|---|---|---|
| 0 130 137 | 1/1985 | European Pat. Off. . |
| 24 30 069 | 1/1975 | Germany . |
| 878127 | 9/1961 | United Kingdom . |
| 1197364 | 7/1970 | United Kingdom . |
| WO 80/00478 | 3/1980 | WIPO . |
| WO 80/00481 | 3/1980 | WIPO . |
| WO 90/04115 | 4/1990 | WIPO . |
| WO 93/04298 | 3/1993 | WIPO . |

*Primary Examiner*—Douglas C. Butler
*Attorney, Agent, or Firm*—Young & Thompson

[57] ABSTRACT

The invention relates to a friction brake (1) adjuster, comprising an elongated fastener (24) with first and second ends (27, 29). The fastener (24) is arranged in a bore (38) in a brake piston (7), which is displaceable relative to a brake housing (2) surrounding the friction brake (1) to a braking position and to a retracted position. The brake piston (7) can be displaced to the retracted position by a spring member (22). The invention is characterized in: that a tube (36) is interference-fitted in the bore (38) of the brake piston (7), that the tube (36) is displaceable relative to the brake piston (7), that the fastener (24) is joined at its first end (27) to the brake housing (2), that the fastener (24) at its second end (29) has a first abutment (32), that the tube (36) has a second abutment (42), that the spring member (22) abuts against the first and second abutments (32, 42), that the spring force of the spring member (22) acts to move the first and second abutments (32, 42) apart, that the tube (36) has first and second end surfaces (39, 41), that the first end surface (39) is intended, in the braking position, to abut against the first abutment (32), and that the second end surface (41) is intended, in the retracted position, to abut against the brake housing (2).

7 Claims, 1 Drawing Sheet

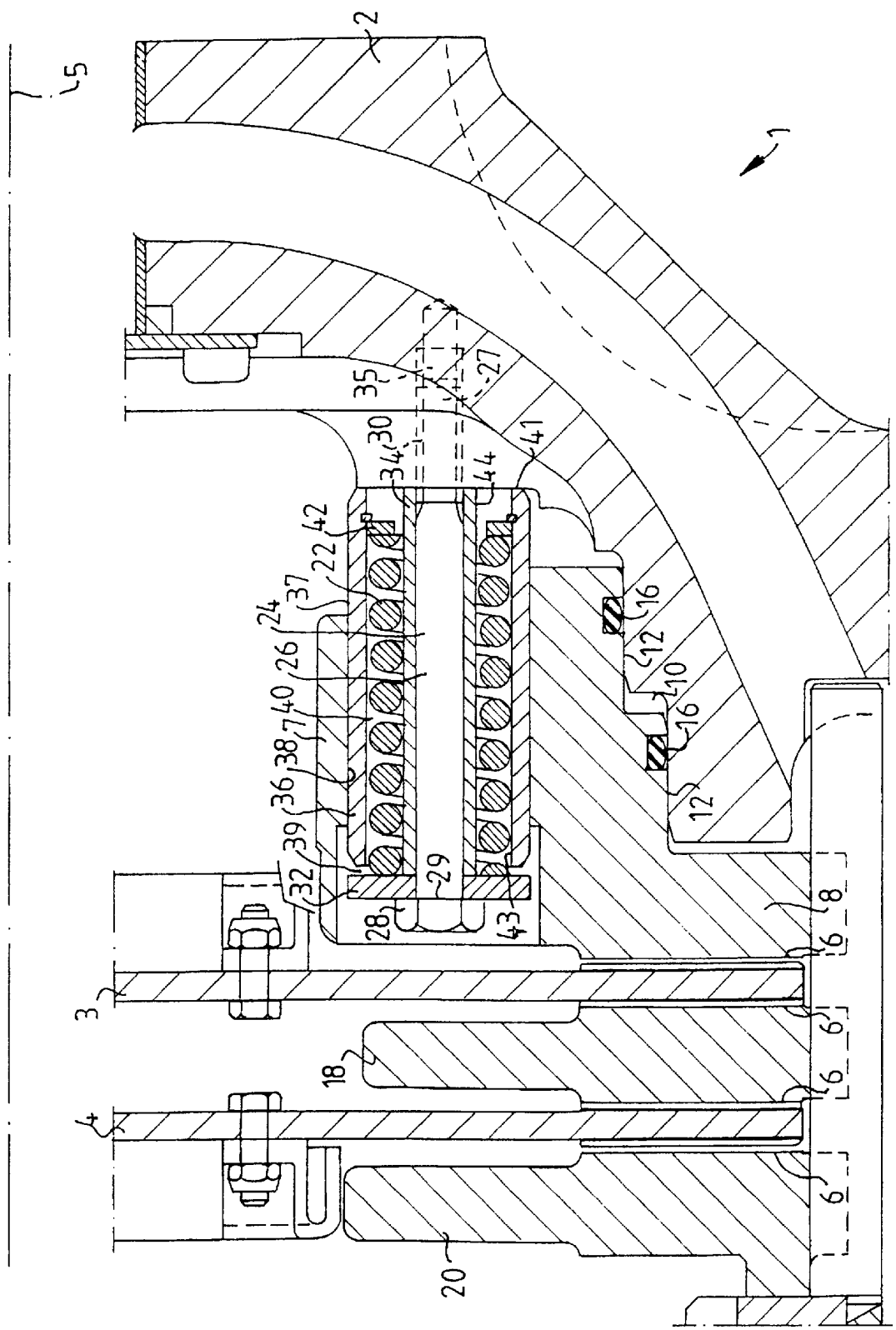

PLAY ADJUSTMENT

The present invention relates to a friction brake adjuster, comprising an elongated fastener means with a first end and a second end, said fastener means being arranged in a bore in a brake piston, which is displaceable relative to a brake housing surrounding the friction brake to a braking position and to a retracted position, the brake piston being displaceable to the retracted position by means of a spring member.

Such an adjuster is known through the document WO,A1,9004115, which maintains a constant play between the surfaces of the friction discs in a friction brake when the brake piston is in its retracted position, regardless of how much the friction discs have been worn down. An annular brake piston is provided with axial bores, which are aligned with corresponding holes in the wall of a housing surrounding the friction brake. Elongated fastener means provided with bolt heads are screwed into one or more of the bores in the brake piston. The fastener means extends into the corresponding aligned bore in the wall of the brake housing. The fastener means has at that end two flanges. A resilient clamp element is clamped in the bore in the housing wall. The clamp element is disposed between the flanges of the fastener means and thus limits the movement of the fastener means and thereby also the axial movement of the brake piston.

The brake piston is displaceable to a braking position by means of hydraulic fluid under pressure, supplied to a space behind the brake piston. Cylindrical helical springs are disposed in the bores which are not provided with fastener members. The helical springs are pretensioned and urge the brake piston to its retracted position. As the friction discs are gradually worn down, the brake piston is displaced further towards the brake discs, which means that the clamping element will be pulled by the fastener means. However, the force required to displace the clamping element in the bore is greater than the combined force of the spring acting on the clamping element when the brake piston is in its retracted position. This means that the brake piston will be in a new starting position in the retracted position, which means, in turn, that during braking, the brake piston will always be displaced the same distance regardless of how much the friction discs have been worn down. Thus, a constant hydraulic fluid volume can be supplied for each braking operation.

A disadvantage with the adjuster according to WO,A1, 9004115 is that the more the friction discs are worn down, the more the springs will be tensioned since the anchoring point of each spring in the housing wall is not moved as the clamping element is displaced. This means that more force must be overcome during braking, and the risk of spring breakage also increases, thus shortening the life of the friction brake.

One purpose of the present invention is to achieve an adjuster of the type described by way of introduction, which keeps the resilient element under a constant pretension in the retracted position regardless of how much the frictional surfaces of the discs have been worn down.

Another purpose of the present invention is to achieve an adjuster of the type described by way of introduction which has a compact design and which thereby requires very little space in a friction brake.

This is achieved according to the invention by virtue of the fact that a tube is interference-fitted in the bore in the brake piston, that the tube is displaceable relative to the brake piston, that the fastener means is joined at its first end to the brake housing, that the fastener means at its second end has a first abutment, that the tube has a second abutment, that the spring member abuts against the first and second abutments, that the spring force of the spring member acts to move the first and second abutments away from each other, that the tube has a first end surface and a second end surface, that the first end surface is intended, in the braking position, to abut against the first abutment, and that the second end surface is intended, in the retracted position, to abut against the brake housing.

Such an adjuster makes it possible, firstly, to maintain a constant clearance between the frictional surfaces in a friction brake and, secondly, to maintain a constant pretension in the spring when the brake piston is in its retracted position, regardless of how worn the frictional surfaces are.

The invention will be described in more detail below with reference to examples shown in the accompanying drawing, where FIG. 1 shows a sectional partial view of an adjuster for a friction brake in accordance with the invention.

The reference number 1 in FIG. 1 designates a friction brake, which is enclosed in a brake housing 2. The friction brake 1 is provided with two brake discs 3,4 which are mounted on an axle 5, such as the wheel axle of a vehicle. The brake discs 3,4 are provided with annular friction linings 6. Since FIG. 1 is a sectioned partial view of a friction brake 1, the axle 5 is only shown as a dash-dot line. The friction brake 1 has a brake piston 7 which is made in one piece with a pressure plate 8. The brake piston 7 is annular and defines, together with the brake housing 2, an enclosed annular space 10 into which hydraulic fluid can be supplied under pressure. The contact surfaces 12 between the brake piston 7 and the brake housing 2 form a cylindrical slide surface which is sealed by means of seals 16.

The brake piston 7 can be displaced to a braking position by supplying hydraulic fluid under pressure to the space 10. The brake piston 7 is then displaced towards the brake discs 3,4, and the pressure plate 8 of the brake piston 7 will come into contact with that brake lining 6 of the brake disc 3, which faces the pressure plate 8.

Between the brake discs 3,4 there is an annular stator disc 18 which, during braking, abuts against the friction linings 6. An annular counter-disc 20 is arranged, during braking, to abut against the friction lining 6 on the brake disc 4, which faces away from the brake piston 7. The counter-disc 20 takes up the forces from the brake piston 7 during braking.

In order to release the friction brake 1, the brake piston 7 is displaced to a retracted position by means of one or more spring members 22, such as a helical spring which will be described in more detail below.

In the frictional contact between, on the one hand, the friction linings 6 and, on the other hand, the pressure plate 8, the stator disc 18 and the counter-disc 20, the friction linings 6 are worn, thus reducing the thickness of the friction linings 6. This means that the clearance between, on the one hand, the friction linings 6 and, on the other hand, the pressure plate 8, the stator disc 18 and the counter-disc 20, increases which means that the brake piston 7 must be displaced further during braking. This results in a greater volume of hydraulic fluid having to be supplied to the space 10 during braking.

It is of the utmost importance that the friction brake 1 can be rapidly engaged with a limited volume of hydraulic fluid if the driver is to feel that the brake is reliable. If the hydraulic fluid pressure in the standard brake system of a vehicle should fail for some reason, there is an emergency system which takes over. Such an emergency system can be one or more pressure containers which store a limited volume of hydraulic fluid under pressure, which is supplied to the annular space 10 for emergency braking. It is thus important that the volume of hydraulic fluid for which there is space in the annular space 10 be limited and preferably be kept constant, so that a number of emergency brakings can be carried out to stop the vehicle.

In order to maintain a constant play between, on the one hand, the friction linings 6 and, on the other hand, the pressure plate 8, the stator disc 18 and the counter-disc 20, an adjuster is arranged between the brake piston 7 and the brake housing 2. The adjuster comprises, in accordance with a preferred embodiment of the invention, a fastener means 24 in the form of a bolt 24 with a shank 26 having a thread 30 at a first end 27 and a head 28 at a second end 29. The bolt 24 is screwed by means of the thread 30 into a threaded hole 35 in the brake housing 2. A first washer 32 abuts against the head 28 of the bolt 24 which is fixed by means of the end of a sleeve 34 surrounding the shank 26. The sleeve 34 is in turn fixed between the first washer 32 and the brake housing 2 and is held securely by the bolt 24.

A tube 36 is, by means of an outer wall 37 of the tube 36, mounted with a predetermined interference fit in a bore 38 in the brake piston 7 and is displaceable relative to the brake piston 7 in the bore 38. The bore 38 extends essentially in the direction of movement of the brake piston 7. The tube 36 surrounds the screw 24 essentially concentrically and, in accordance with the preferred embodiment, has a circular cross section. The tube 36 has a first 39 and a second 41 end surface, the first end surface 39 being intended, in the braking position, to abut against the first washer 32. The second end surface 41 is intended, in the retracted position, to abut against the brake housing 2. Thus, the first washer 32 has an outer diameter which is greater than the inner diameter of the tube 36.

The axial distance between the first washer 32 and the tube 36 in the retracted position corresponds to the total clearance desired between, on the one hand, the friction linings 6 and, on the other hand, the pressure plate 8, the stator disc 18 and the counter-disc 20. The axial distance between the first washer 32 and the tube 36 in the retracted position is achieved, for example, by selecting a suitable length of the tube 36 and/or the sleeve 34. Alternatively, the thickness of the first washer 32 can be made of suitable size.

In an annular chamber 40 formed between the inner wall 43 of the tube 36 and the outer wall 44 of the sleeve 34, a spring member 22 is mounted. According to a preferred embodiment, the spring member 22 consists of a cylindrical helical spring 22, which is pretensioned with a predetermined force between first and second abutments 32,42, the first abutment 32 consisting of the first washer 32 and the second abutment 42 consisting of a second washer 42 fixed to the inner wall 43 of the tube 36.

The interference fit between the outer wall 37 of the tube 36 and the bore 38 should be such that the force from the spring 22 is not capable of displacing the tube 36 in the bore 38.

The adjuster functions as follows: Initially, the tube 36 is mounted in the bore 38 so that the axial distance between the washer 32 and the tube 36 is somewhat shorter than the total clearance desired between, on the one hand, the friction linings 6 and, on the other hand, the pressure plate 8, the stator disc 18 and the counter-disc 20 when the brake piston 7 is in its retracted position. The screw 24 is then tightened so that the spring 22 will be pretensioned. When the friction brake 1 is engaged for the first time, i.e. when the brake piston 7 is displaced to the braking position by supplying hydraulic fluid under pressure to the annular space 10, the brake piston 7 will bring with it the tube 36 until the tube 36 is stopped by the first washer 32. The force of the spring 22 acting on the tube 36 is, as was previously mentioned, less than the force required to displace the tube 36 relative to the brake piston 7, and this makes it possible for the brake piston to bring with it the tube towards the brake discs 3,4. Since the force from the hydraulic fluid acting on the brake piston 7 is substantially greater than the force required to displace the tube 36 in the bore 38, the tube 36 will be displaced relative to the brake piston 7 that distance which is required for the pressure plate 8 of the brake piston 7 to reach the friction lining 6 on the brake disc 3 and to thereafter, in the braking position, press the friction linings 6 against the stator disc 18 and the counter-disc 20. The tube 36 is thus displaced relative to the brake piston 7 in the direction away from the brake discs 3,4 when the tube strikes the first washer 32.

When the friction brake 1 is released, i.e. when the pressure in the annular space 10 is reduced, the spring 22 will move, via the tube 36, the brake piston 7 away from the brake discs 3,4 until the second end surface 41 of the tube 36 strikes the brake housing 2 as the brake piston 7 reaches its retracted position. Thus, the force of the spring 22 acts to move the first and the second washer 32,42 away from each other. During this retracting movement of the brake piston 7, the tube 36 is not displaced relative to the brake piston 7.

When the friction linings 6 after extended use have been worn down, so that the thickness of the friction linings 6 is reduced, the tube 36, when braking, will be displaced relative to the brake piston 7, since the braking position for the brake piston 7 will be displaced closer to the brake discs 3,4. When the brake is thereafter released, the brake piston 7 will be displaced by means of the spring 22 to a new retracted position which is closer to the brake discs 3,4 as compared to the previous retracted position. The distance between the new and the previous retracted position of the brake piston 7 corresponds to the total reduction in thickness of the friction linings 6 due to wear. Thus, the distance which the brake piston 7 moves from the braking position to the retracted position will always be the same.

The annular space 10 will become larger when the friction linings 6 are worn down, but since the distance which the brake piston 7 moves from the braking position to the retracted position is always the same, a constant volume of hydraulic fluid will always be pressed out of the annular space 10 when the brake piston 7 is moved back to the retracted position. This means that a constant volume of hydraulic fluid will always be required to apply the friction brake 1.

Since the second end surface 41 of the tube 36 in the retracted position always abuts against the brake housing 2, the pretension of the spring will be constant and independent of how much the friction linings 6 have been worn down, which increases the life of the spring 22 and thus the life of the friction brake 1.

According to the invention, an arbitrary number of adjusters can be mounted in the annular brake piston 7.

The preferred embodiment described above is a disc brake with two brake discs. The number of brake discs can, however, vary.

The invention is not limited to a disc brake, and therefore the adjuster can be applied to other types of friction brakes.

What is claimed is:

1. Adjuster for a friction brake (1), comprising an elongated fastener means (24) with a first end (27) and a second end (29), said fastener means (24) being arranged in a bore (38) in a brake piston (7), which is displaceable relative to a brake housing (2) surrounding the friction brake (1) to a braking position and to a retracted position, the brake piston (7) being displaceable to the retracted position by means of a spring member (22), characterized in:

that a tube (36) is interference-fitted in the bore (38) in the brake piston (7), that the tube (36) is displaceable relative to the brake piston (7), that the fastener means (24) is joined at its first end (27) to the brake housing (2), that the fastener means (24) at its second end (29) has a first abutment (32), that the tube (36) has a second abutment (42), that the spring member (22) abuts against the first and second abutments (32,42), that the spring force of the spring member (22) acts to move the first and second abutments (32,42) away from each other, that the tube (36) has a first end surface (39) and a second end surface (41), that the first end surface (39) is intended, in the braking position, to abut against the first abutment (32), and that the second end surface (41) is intended, in the retracted position, to abut against the brake housing (2).

2. Adjuster according to claim 1, characterized in that the fastener means (24) is a bolt (24) with a shank (26), having a thread (30) at the first end (27), and a head (28) at the second end (29).

3. Adjuster according to claim 2, characterized in that the first abutment (32) is a first washer (32), which is fixed between the head (28) of the bolt (24) and the end of a sleeve (34) surrounding the shank (26) of the bolt (24).

4. Adjuster according to claim 3, characterized in that the length of the sleeve (34) exceeds the length of the tube (36).

5. Adjuster according to claim 1, characterized in that the second abutment (42) consists of a second washer (42) which is fixed to an inner wall (43) of the tube (36).

6. Adjuster according to claim 1, characterized in that the spring member (22) consists of a cylindrical helical spring (22) which concentrically surrounds the fastener means (24).

7. Adjuster according to claim 1, characterized in that the spring force is less than the force required to displace the tube (36) relative to the brake piston (7).

* * * * *